Aug. 7, 1962   J. G. MADGE ETAL   3,048,214
GLASS ROLLING APPARATUS
Filed Nov. 10, 1958   9 Sheets-Sheet 1
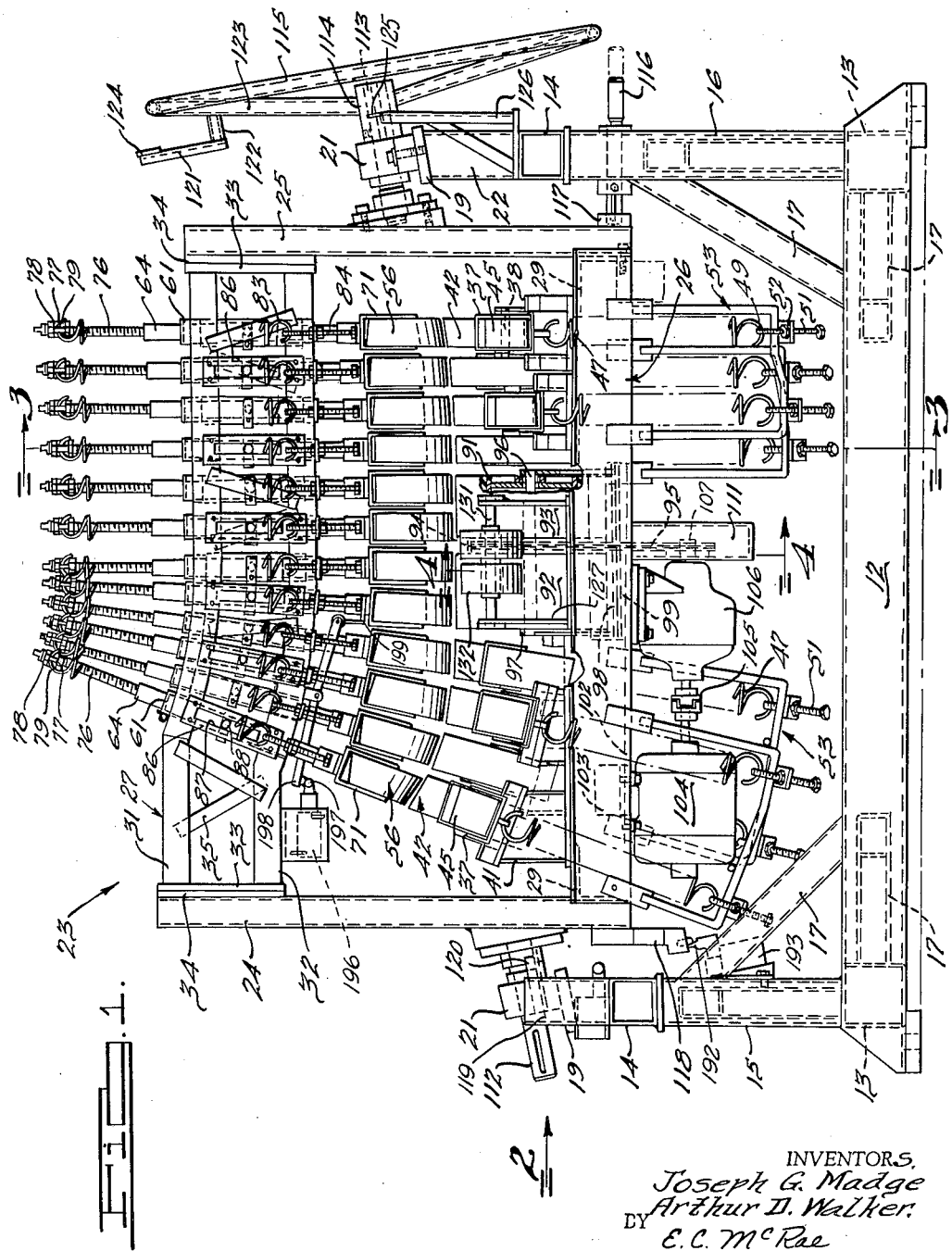
INVENTORS.
Joseph G. Madge
Arthur D. Walker
BY E. C. McRae
J. H. Oster
J. J. Roethel
ATTORNEYS

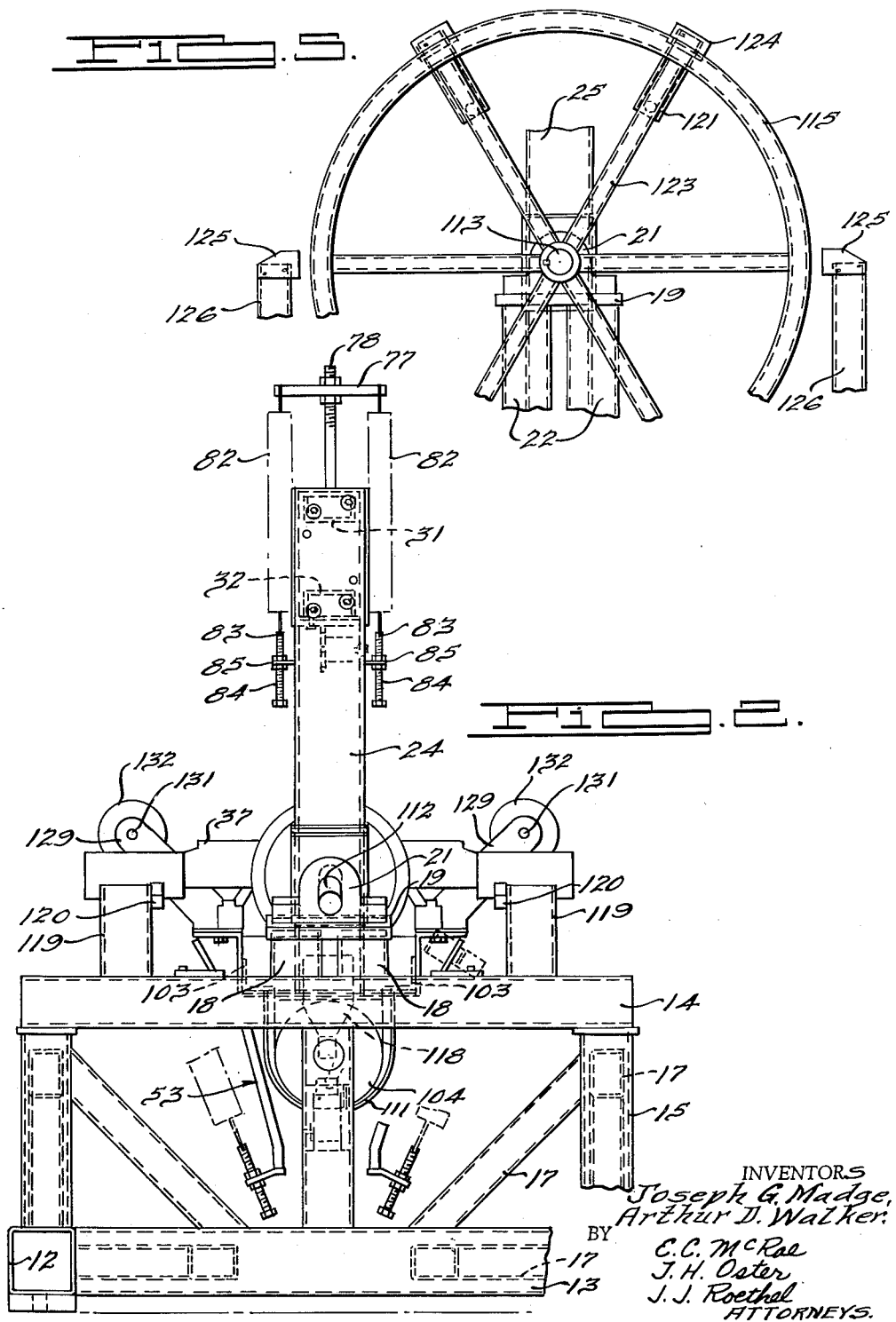

Aug. 7, 1962     J. G. MADGE ETAL     3,048,214
GLASS ROLLING APPARATUS
Filed Nov. 10, 1958     9 Sheets-Sheet 3
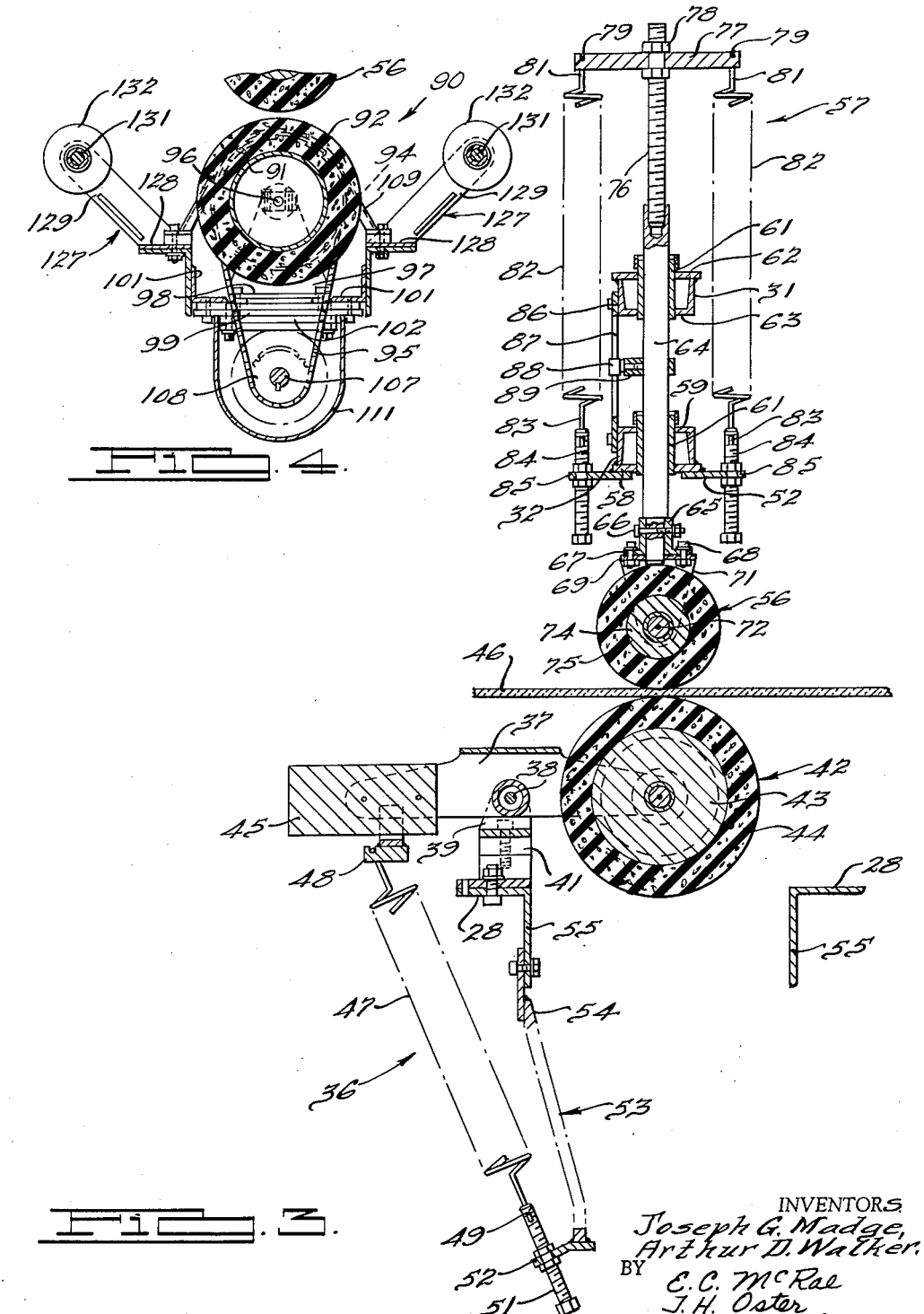

Aug. 7, 1962  J. G. MADGE ETAL  3,048,214
GLASS ROLLING APPARATUS
Filed Nov. 10, 1958  9 Sheets-Sheet 4
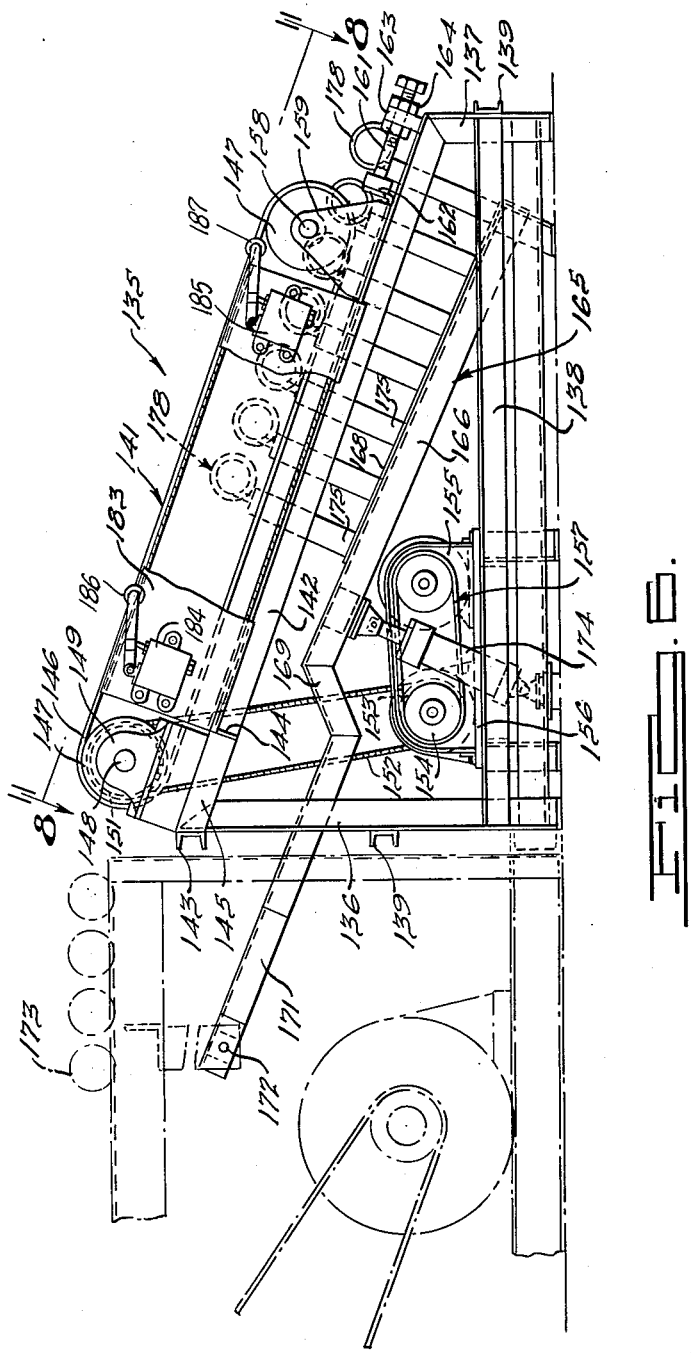
INVENTORS.
Joseph G. Madge,
Arthur D. Walker,
BY C.C. McRae
J.H. Oster
J.J. Roethel
ATTORNEYS.

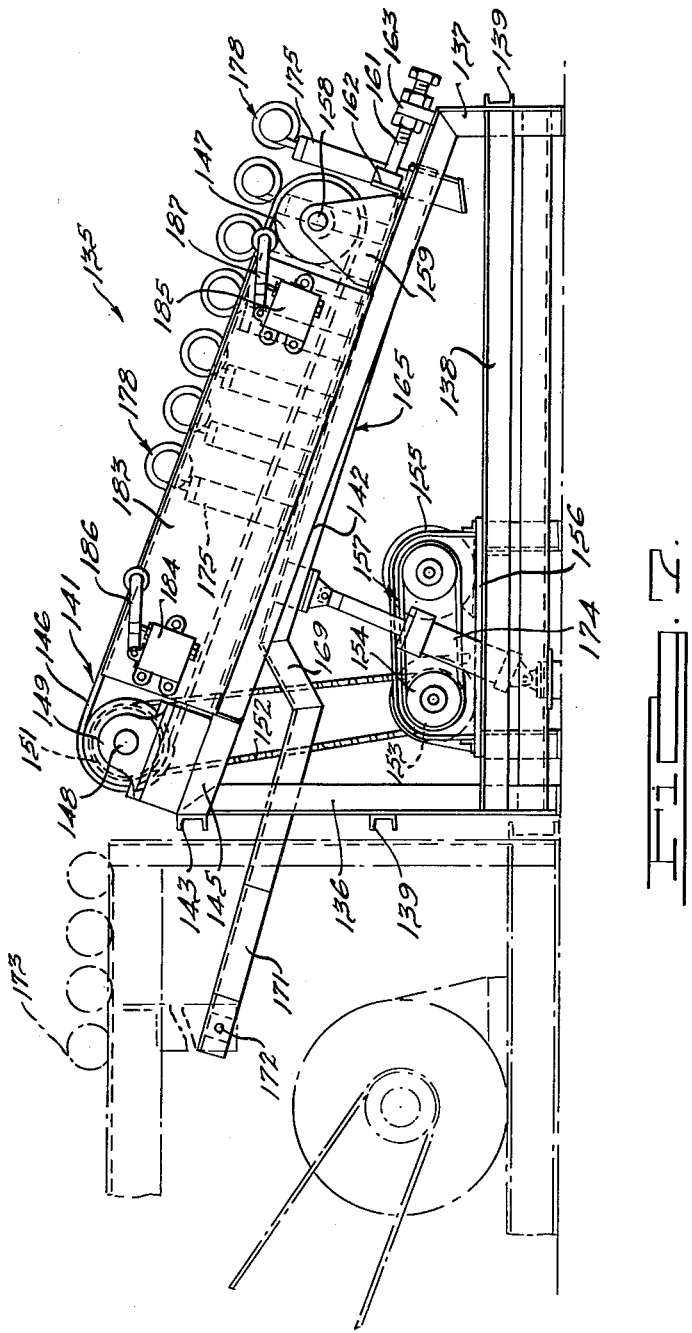

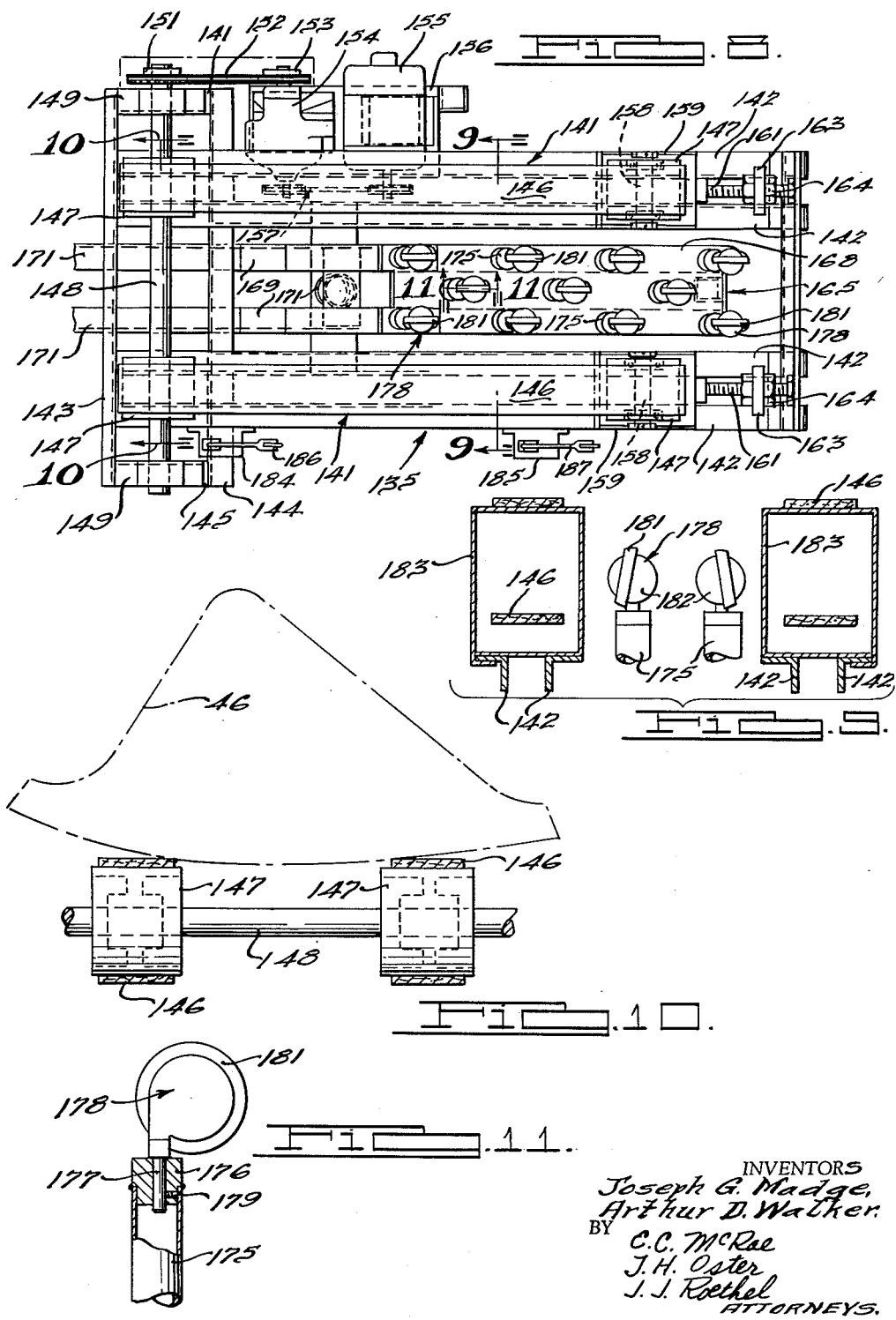

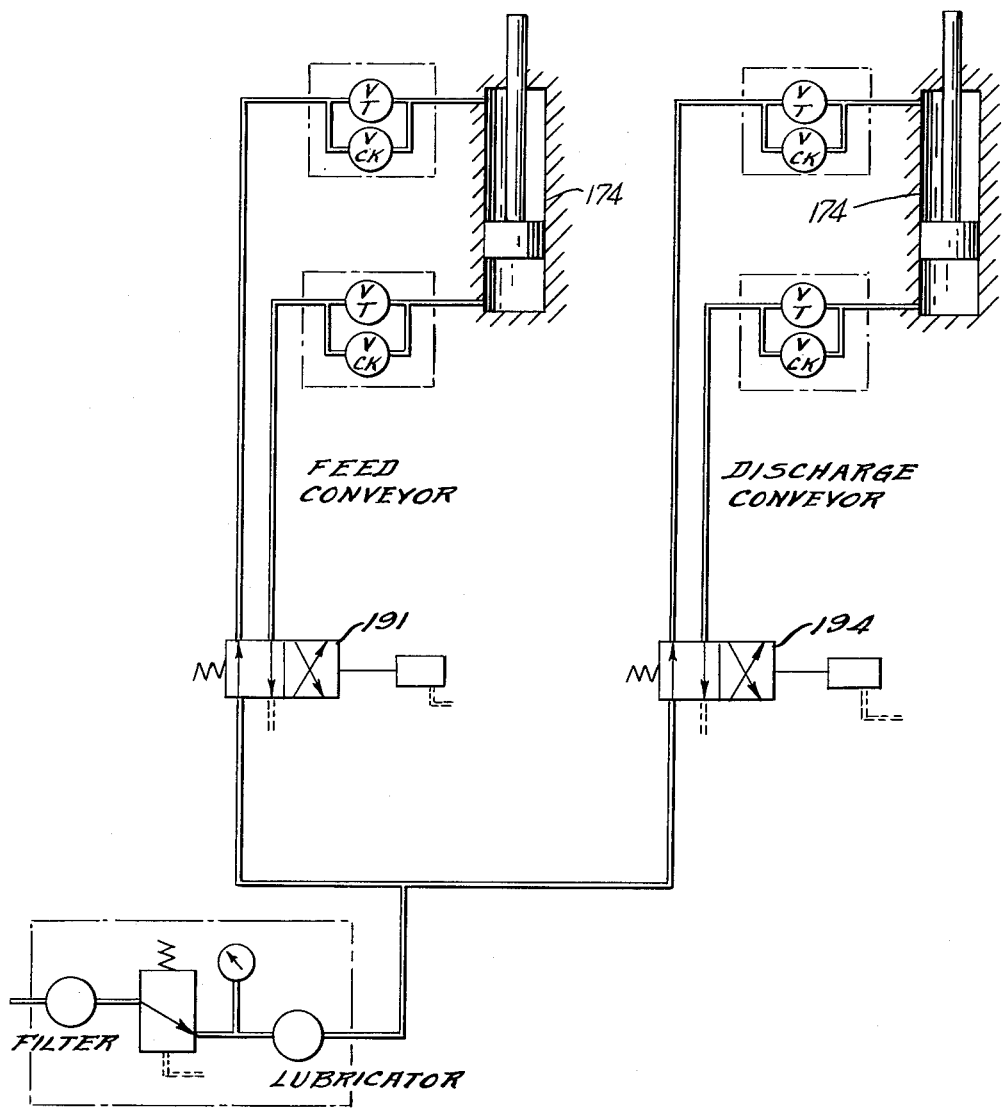

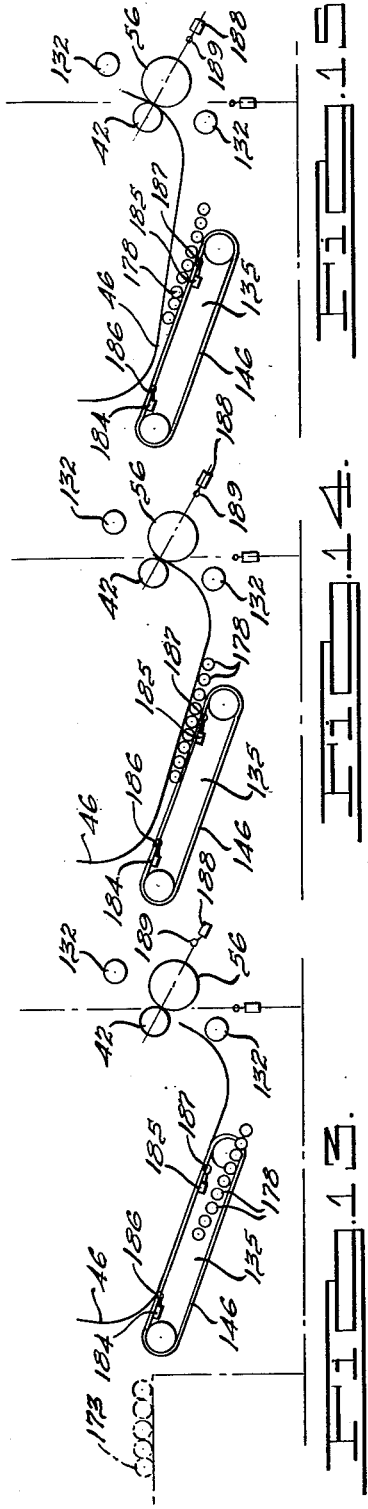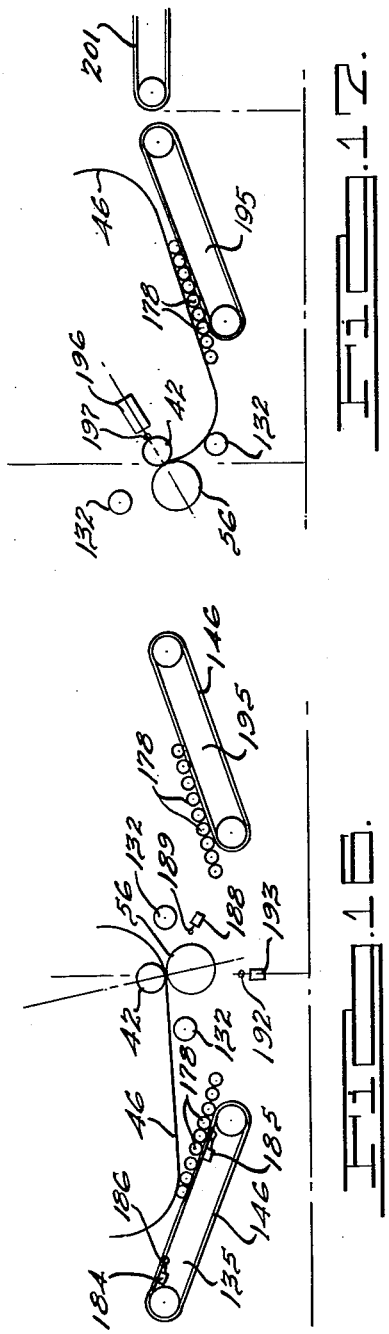

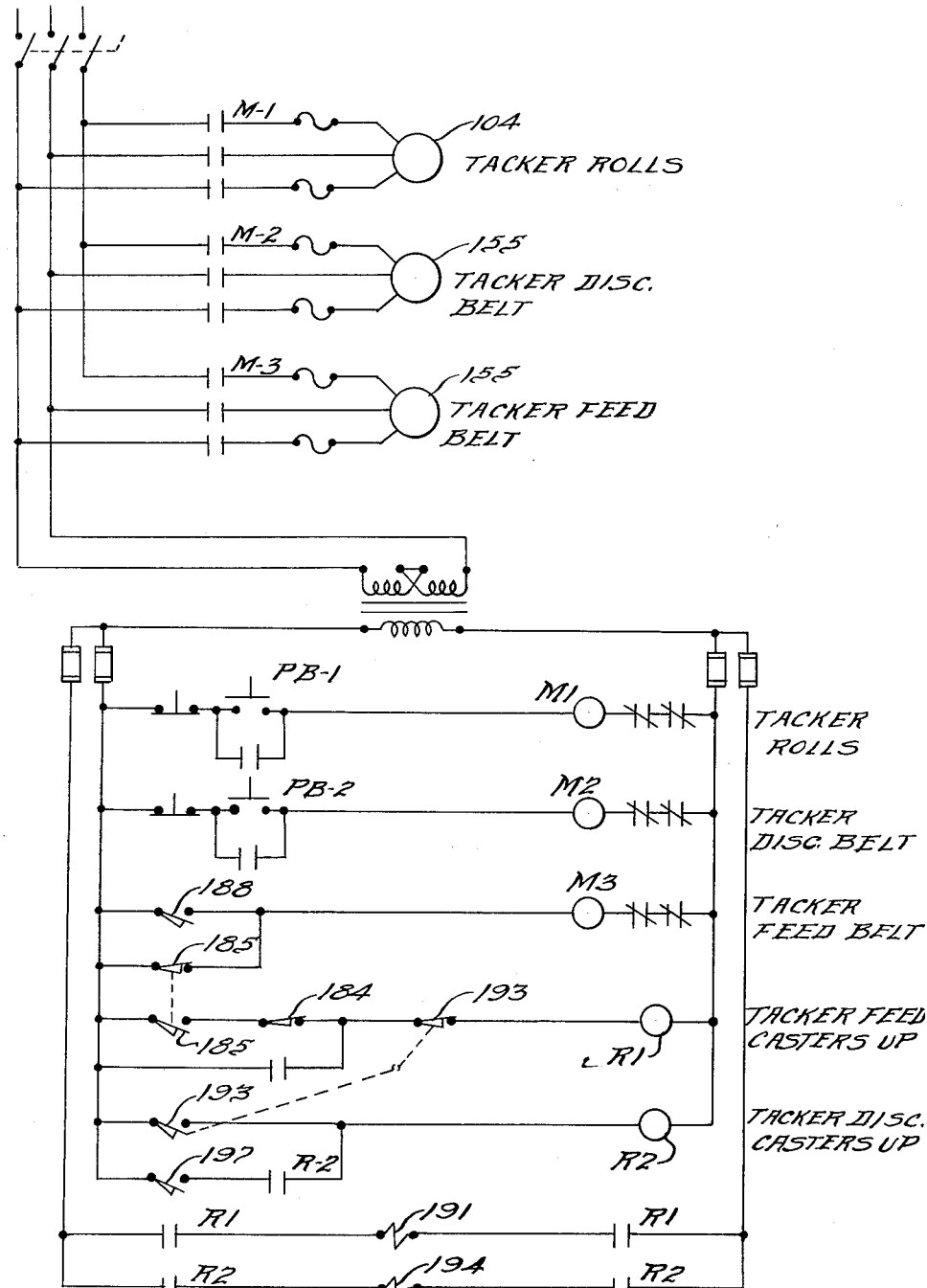

United States Patent Office 3,048,214
Patented Aug. 7, 1962

3,048,214
GLASS ROLLING APPARATUS
Joseph G. Madge, Dearborn, and Arthur D. Walker, Plymouth, Mich., assignors to Ford Motor Company, Dearborn, Mich., a corporation of Delaware
Filed Nov. 10, 1958, Ser. No. 772,794
13 Claims. (Cl. 156—443)

This invention relates to the production of laminated safety glass and more particularly to an apparatus for applying pressure to two curved sheets of glass having a sheet of plastic material interposed therebetween, as is used in the production of laminated automobile windshields.

As was more fully described in U.S. Patent No. 2,673,168, the conventional production of laminated safety glass involves the insertion of a lamina of sheet plastic material, such as polyvinyl butyral, between two sheets of glass. The raw sandwich, so formed, is then subjected to de-airing and tacking processes. Generally, the raw sandwich is twice passed through squeeze rolls adapted to apply a nipping or squeeze type pressure starting at one end of the sandwich and progressively passing down the length of the sandwich to the other end.

The first pass has as its objective the elimination of all air pockets between the layers, that is, the de-airing of the sandwich. Before being passed through the rolls a second time, the de-aired sandwich is heated to a temperature sufficient to render the vinyl plastic tacky. The sandwich is then passed through the rollers to cause the glass layers to adhere to the plastic interlayer. After the second or tacking pass through the rollers, the windshield is said to be prepressed and is ready for immersion in the heated oil of an autoclave to render the sandwich transparent.

In recent years the trend in automobile design has multiplied the demand for curved laminated glass, particularly for automobile windshield and rear window use. At first these glass structures were provided with only a slight and substantially uniform curvature. It was an objective of the above-identified patent to disclose an apparatus capable of quickly and effectively de-airing and prepressing such curved laminated glass.

Further advances in windshield design resulted in the so-called "wrap-around" windshield in which the central portion of the windshield is a gentle curve and the end portions are curved to a much greater degree. The apparatus of the above-mentioned patent had limitations in the handling of the curved glass required for such windshields. Accordingly, the structure disclosed in U.S. Patent No. 2,729,581 was devised to de-air and prepress or tack the curved glass sheets used in the lamination of wrap-around windshields.

Ordinary wrap-around windshields are already being displaced by windshields having the characteristics of a wrap-around windshield to which is added a curved upper edge portion extending rearwardly into the area formerly covered by the forward portion of the metal roof structure. In our co-pending application Serial No. 749,197, filed July 11, 1958, now abandoned, we have disclosed a glass rolling apparatus representing a further improvement over the apparatus described in the above-mentioned U.S. Patent 2,729,581. The improved apparatus was deemed capable of accommodating the curved glass sheets required to form the advanced type of "wrap-around and wrap-over" windshields or, in general, to accommodate window glass structures having compound curves.

It is an object of the present invention to provide an apparatus for de-airing and tacking curved glass structures embodying the principle of operation of the structure disclosed in our co-pending application Serial No. 749,197 but having certain structural distinctions providing an even more efficient apparatus for performing the task of applying a uniform pressure across the width of the glass sandwich.

As does the de-airing and prepressing structure disclosed in our co-pending application, the structure embodying the present invention comprises a frame supporting a plurality of opposed pairs of elastomer rolls. At least one of the rolls is power driven, the driven roll preferably being one which engages the underside of the glass sandwich along a substantially centrally located longitudinally extending element of the glass. The other rolls are freely rotatable, being driven only by frictional engagement with the glass sandwich as the latter is driven through the apparatus by the power driven roll. The freely rotatable rolls are supported on the frame on independent support structures which selectively position the rolls relative to the frame so that the opposed pairs of rolls will conform substantially to the contour of the glass sheets laterally of the longitudinal axis of the sheets. The support structures include means biasing each of the freely rotatable rolls toward the glass sheets as the latter pass through the rolls. The present invention also incorporates the tiltable frame structure of the earlier patented structures.

It is a further object of the present invention to provide an improved conveyor system for handling the glass assemblies or sandwiches as they travel from the initial loading station through the de-airing apparatus, warming oven and prepressing apparatus on the way to their immersion in the autoclave. The improved conveyor system embodies a conveyor which in its preferred form comprises a free standing unit adapted to be used, with minor variations in its control devices, on either side of a de-airing or prepressing apparatus to transport the glass assemblies or sandwiches toward or from the de-airing and tacking apparatus, as the case may be. The conveyor structure comprises a base structure having an inclined superstructure supporting at each side thereof an endless belt and, between the belts, a swingable structure supporting a plurality of free rolling caster devices.

On the ingress side of a de-airing or tacking apparatus, the conveyor is adapted to support and transport the glass sandwich on the conveyor belts until a predetermined position relative to the receiving apparatus is reached. This position is that substantially at which the nipper rolls engage and begin to pull the glass sandwich therebetween. In proper timed relation to the beginning of this nipper roll action, the caster supporting structure is raised so that the weight of the glass sandwich is lifted from the belts and is transferred to the casters. The latter, being freely rotatable offer substantially no resistance to the forward movement of the glass structure.

On the egress side of the de-airing or tacking apparatus, whichever it may be, the conveyor receives the glass sandwich on the casters. As the sandwich leaves the nipper rolls, the casters are lowered and the full weight of the glass sandwich is transferred to the belts for continued movement of the sandwich away from the particular apparatus through which it has just passed.

Other objects, advantages and features of the present invention will be made more apparent as this description proceeds, particularly when considered in connection with the accompanying drawings, wherein:

FIG. 1 is a front elevational view, partially in section, of the glass rolling apparatus embodying the present invention;

FIG. 2 is an end elevational view of the glass rolling apparatus looking in the direction of the arrow 2 in FIG. 1;

FIG. 3 is an enlarged fragmentary sectional view taken substantially through line 3—3 of FIG. 1 looking in the direction of the arrows;

FIG. 4 is an enlarged fragmentary sectional view taken substantially through line 4—4 of FIG. 1 looking in the direction of the arrows;

FIG. 5 is an enlarged fragmentary end elevational view of the glass rolling apparatus from the end opposite that shown in FIG. 2;

FIG. 6 is a side elevation of one of the conveyor units adapted to be associated with a glass rolling apparatus as illustrated in FIGS. 1 to 5, inclusive;

FIG. 7 is a view in part similar to FIG. 6 showing the casters forming a part of the glass sandwich supporting and conveying structure in a raised position;

FIG. 8 is a view taken from the direction of the arrows 8—8 in FIG. 6;

FIG. 9 is an enlarged fragmentary sectional view taken substantially through line 9—9 of FIG. 8 looking in the direction of the arrows;

FIG. 10 is a slightly enlarged fragmentary sectional view taken substantially through line 10—10 of FIG. 8 looking in the direction of the arrows;

FIG. 11 is an enlarged fragmentary sectional view taken substantially through line 11—11 of FIG. 8 looking in the direction of the arrows;

FIG. 12 is a schematic air circuit diagram for the conveyor devices;

FIGS. 13 to 17, inclusive, are a diagrammatic representation of the positions assumed by the glass sandwich and components of the conveyor apparatus and glass rolling apparatus as the glass sandwich travels through the pressure applying rolls; and FIG. 18 is a schematic electrical circuit diagram showing the electrical interconnection between the glass rolling apparatus and the conveyor device embodied in the present invention.

The glass rolling or pressing apparatus embodying a part of the present invention comprises a base structure or cradle, generally designated 11. The base structure 11 is a weldment fabricted of square tubing sections. As best seen in FIGS. 1 and 2, the base structure comprises a pair of spaced, longitudinally extending square tubular members 12 connected at corresponding ends by transversely extending square tubular members 13. At each of its ends, the base structure 11 is provided with a laterally extending support bridge comprising a horizontally extending square tubular member 14 paralleling the lower laterally extending member 13. Each tubular cross member 14 is supported on three vertically extending square tubular members. It will be noted, see FIG. 1, that the square tubular members 15 supporting the left end cross member 14 are somewhat shorter than the square tubular members 16 supporting the right end cross member 14, for a reason to be explained. All corners of the framework forming the base structure are suitably braced by diagonally extending square tubular members 17.

The left end cross member 14 has secured to its upper surface a pair of closely positioned short upright members 18 (see FIG. 2) capped by a plate 19 forming a base for a pillow block 21. The right end cross member 14 likewise has secured to its upper surface a pair of upright members 22. The upright members 22 are also capped by a plate 19 forming a base for a pillow block 21. It will be noted that a line drawn through the centers of the pillow blocks 21 is angularly inclined relative to the horizontal plane of the base, for a purpose to be explained.

The pillow blocks 21 provide journals for an inner frame assembly, generally designated 23. The frame assembly 23 is a weldment comprised of two side members 24 and 25, each preferably formed of a rectangular tubular member connected by a bottom support structure, generally designated 26, and an upper support structure, generally designated 27.

Each support structure 26 and 27, in itself, is a weldment formed of channel sections and plates. Referring particularly to FIGS. 1 and 2, the lower support structure 26 comprises two angle iron members 28 mounted in reversed parallel relationship to each other and connected at substantially each of their ends by a laterally extending angle iron member 29. The end members 29 are centrally welded or otherwise securely fastened to the side members 24 and 25 at their lower ends.

The upper support member 27 is comprised of an upwardly facing longitudinally extending channel section 31 and a lower longitudinally extending inverted channel section 32, each of which are provided with a gradually curved portion intermediate its ends. The upper and lower channel sections 31 and 32 are secured to parallel vertical end plates 33 which are bolted (the bolts not being shown) or otherwise secured to suitable pads 34 on the side members 24 and 25, respectively. The upper and lower channel sections 31 and 32 are further braced and maintained in spaced relationship by a series of staggered straps 35, the latter being suitably welded in place.

The weldment support structures 26 and 27 are designated as bottom or lower support and upper support structures in that they support a plurality of lower and upper elastomer roll devices, respectively. A typical pair of such devices and their immediate supporting structures are shown in FIG. 3. Each lower roller device, generally designated 36, as exemplified in FIG. 3, comprises a rocker arm 37 fulcrummed intermediate its ends on a pivot shaft 38. The pivot shaft 38 is journalled in an upwardly opening U-shaped bracket 39 which may be supported on spacers 41 secured to the upper surface of the angle iron 28. At one end the rocker arm 37 has journalled thereon an elastomer roller 42. The roller 42 comprises a cast iron pulley 43 having bonded thereon a layer of rubber 44. At the end opposite the roller supporting end, the rocker arm 37 is provided with a metal plate 45 adapted to counterbalance the weight of the roller 42.

The roller 42 is preferably biased upwardly against the underside of the glass sandwich 46, the latter being represented in dot and dash outline. The biasing means preferably comprises an elongated coil spring 47 having one end connected to a spring retainer 48 secured to the rocker arm 37 and its other end to a connection 49 carried on the end of an adjusting screw 51. This screw is carried by the base portion 52 of a U-shaped hanger or bracket 53 having its upwardly extending leg portions 54 bolted or otherwise secured to the depending leg 55 of the angle section 28. It will be readily apparent that the biasing or tension force of the spring 47 may be increased or decreased by appropriate adjustment of the screw 51.

It should be noted that the lower roller devices 36, which include all the roller devices mounted on the lower or bottom support structure 26, except a pair of devices to be hereinafter described, are staggered so as to be mounted on opposite sides of the inner frame assembly 23. For example, and with reference to FIG. 1, from left to right the first and third roller devices 36 are supported on the front angle iron section 28. The second and fourth devices 36 are supported on the rear angle iron section 28. Similarly, the first and third devices 36 from right to left are in front and the second and fourth are in the rear. However, the center of all the rollers 42 lie on the vertical longitudinal centerline plane of the inner frame assembly 23.

The upper row of elastomer rollers, herein designated 56, because they are of slightly smaller diameter than the rollers 42, are supported on upper roller support devices, generally designated 57. It will be noted that the lower inverted channel section 32 of the upper support structure 27 is provided with a longitudinally extending plate 58 paralleling its base portion 59. The plate 58 and base portion 59 are provided with aligned apertures receiving a cylindrical bushing or guide sleeve 61. The upper channel section 31 also has secured to it a plate 62 paralleling its base portion 63. The plate 62 and base portion 63 are also provided with aligned apertures receiving cylindrical bushings or guide sleeves 61. The upper and lower guide sleeves 61 are axially aligned and slidably receive a shaft 64.

A flanged collar 65 is secured to the lower end of the shaft 64 by a suitable bolt 66. The collar flange 67 is secured by bolts 68 to the base 69 of a yoke 71. The yoke 71 is provided with a shaft 72 journaling a roller 56. Each roller 56, as do the rollers 42, comprises a cast iron pulley 74 having bonded thereon a layer of rubber 75 or other suitable elastomer material.

It will be noted that each shaft 64 is provided with an elongated screw 76 projecting upwardly from the upper end of the shaft. Each screw 76 carries a tension plate 77 adapted to be adjustably positioned on the screw by means of jam nuts 78. Each tension plate 77 is provided with a notch 79 at each of its ends. Each notch 79 is adapted to receive one loop end 81 of a tension spring 82. The other loop end 83 of the tension spring 82 is hooked into an aperture in an adjusting screw 84 carried on an arm 85 secured to the plate 58 of the channel section 32.

An important aspect of the present invention is clearly illustrated in FIG. 1. It will be noted that the longitudinal axis of the shafts 64 are not all parallel to each other. From right to left, the first seven shafts are shown as being substantially parallel but the remaining shafts are angularly inclined with respect to the vertical with the shaft at the extreme left having the greatest inclination.

The angle of inclination of the shafts is determined by the mean cross-sectional contour of the glass sheets to be run through the nipper rolls. In effect, the glass sandwich is divided into longitudinal elements each of which passes between an opposed pair of rollers. The line of force applied by the opposed rollers under ideal conditions would be perpendicular to each increment of the glass surface, the increments being as small as possible. In practice, and particularly with the apparatus embodying the present invention, the glass sandwich is divided into twelve increments. The longitudinal axis of each shaft 64 is normal to the slope of the increment between the opposed pair of rollers associated with the respective shaft. It will be readily apparent that at the extremely curved sides of the glass sandwich, the angle of inclination selected for the shaft 64 is a compromise angle, that is, it is somewhat less than being normal to the average slope of the increment to avoid interference with the adjacent shaft 64. The condition may be helped by having the side rollers chamfered or contoured to the contour of the glass element to be passed therebetween.

Although the opposed pairs of rollers as shown in FIG. 1 appear to have a space therebetween, it will be understood that this space represents the thickness of the glass sandwich to be passed between the rollers. In the absence of the glass sandwich, the rollers exert pressure against each other. It is, therefore, necessary to carefully set the tension of the opposed springs 47 and 82 to ensure proper alignment of the opposed rollers. Otherwise, the rollers will shift to a position in which the opposed spring forces are in balance but the rollers are out of alignment with the adjacent pairs of rollers.

The rollers may be properly positioned and placed under proper opposed spring forces by inserting a rigid template therebetween, the template having the lateral cross-sectional contour of the glass sheets to be pressed. The rollers will then assume their proper position and it is only necessary to adjust the tension on the springs 47 and 82 until the force exerted on each surface of the template is at the predetermined desired load. Since the forces will be equal to each other, removal of the templet will not affect the positioning of the rollers.

It will be readily apparent that within reasonable limits the rollers may be adjusted to accommodate glass sheets of varying cross-sectional contours. Once set, the rollers will accommodate substantial variations between sheets of glass bent to the same form, particularly within manufacturing tolerances allowed.

Although each shaft 64 is permitted to have axial movement, no rotary movement is permitted. A slotted plate member 86 is welded to the upper and lower channel sections 31 and 32. The longitudinal axis of the slot 87 parallels the longitudinal axis of the shaft 64. The side edges of the slot 87 are engaged by a cam follower or roller 88 carried on an arm 89 secured to the shaft 64.

Not all of the elastomer rollers engageable with the underside of the glass sandwich 46 are mounted on a floating roller support device 36. At the center of the lower row of rollers, there is provided a drive unit, generally designated 90 (see FIG. 4), adapted to frictionally engage the underside of the glass sandwich 46 to propel the latter through the machine. The drive unit 90 comprises an elongated cylindrical hub 91 provided with a layer of rubber divided into two axially spaced sections 92 and 93. In the space between the sections 92 and 93, the hub 91 is provided with a sprocket 94 engaged by a drive chain 95. The hub 91 is rotatably journalled on a shaft 96 carried on a yoke 97. The base 98 of the yoke is bolted to a plate 99. The plate 99 spans the opening between the angle sections 28 forming the bottom support structure 26. The plate 99 is welded to angle irons 101 which in turn are welded to the inner sides of the depending leg portions 55 of the angle irons 28.

A second plate 102 is bolted to the underside of the plate 99 and to angle sections 103 outboard of the plate 99 (see FIG. 1). The plate 102 provides a base for an electric motor 104 coupled by a flexible coupling 105 to a reduction gear unit 106. The output shaft 107 of the gear unit 106 carries a sprocket 108, the latter also being operatively associated with the drive chain 95. Suitable chain guards 109 and 111 may be provided to cover the exposed portions of the chain 95.

Brief mention was made earlier that the inner frame assembly 23 was journalled on the pillow blocks 21 carried by the upright members 18 and 22. It will be noted that the inner frame side member 24 is provided with a stub shaft 112 rotatable in the pillow block 21 carried on the upright members 18. The inner frame side member 25 is also provided with a stub shaft 113 rotatable in the pillow block 21 carried on the upright members 22. The stub shaft 113 projects a substantial distance outwardly of its supporting pillow block 21, the projecting portion receiving the hub 114 of a large hand wheel 115. The hand wheel 115 is provided to permit the inner frame assembly 23 to be rotated about the pivot axis defined by the stub shafts 112 and 113. As best seen in FIG. 1, this pivot axis is angularly inclined for a purpose to be explained.

Should it be desired to lock the inner frame against rotation, it is only necessary to move the detaining pin 116 carried by the side frame member 16, at the right side of the base structure 11 as viewed in FIG. 1, from its dot and dash outline position to its solid outline position. In this latter position the inner end of the pin 116 is engaged in a complementary recess in a block 117 carried on the side of the inner frame member 25 of the inner frame 23 and is effective to lock the inner frame against swinging movement.

Suitable stops are provided to limit the range of rotation or swinging movement of the inner frame assembly 23, when permitted. At its left end, as viewed in FIG. 1, the inner frame member 23 is provided with depending arm 118 located on the longitudinal centerline of the frame member (see FIG. 2). Two upright stanchions 119 located equidistantly on each side of the centerline of the base structure 11 are provided. Each stanchion 119 has securely mounted thereon a stop block or abutment 120 adapted to be engaged by the lower end of the depending arm 118. As illustrated, the inner frame member 23 may be rocked substantially 90° on each side of its upright position before the lower end of the arm 118 positively engages the abutments 120.

It will be noted with particular reference to FIGS. 1 and 5, that the hand wheel 115 is provided with a pair of spaced arms 121 mounted on support studs 122 secured to the handwheel spokes 123. The arms 121 are provided with indicia plates 124 adapted to be aligned, on rotation of the handwheel 115 with respective postion indicating plates 125 at each side of the handwheel (See FIG. 5). The plates 125 are supported on braced stanchions 126. As illustrated, alignment of the edges of either of the plates 124 with its coacting plate 125 indicates an angular displacement of the frame assembly 23 of sixty degrees to one side or the other of the vertical position, as the case may be.

The inner frame member 23 of the rolling apparatus is provided with a pair of outwardly angularly inclined U-shaped brackets 127. The base 128 of each bracket 127 is bolted or otherwise secured to the horizontal surface of the bottom support structure angle irons 28. The upstanding leg portions 129 of each bracket 127 provide end supports for a shaft 131 rotatably mounting a pair of small elastomer rollers 132. The rollers 132 as well as the drive unit roller sections 92 and 93 are substantially tangential to a common plane.

It will be noted that the glass rolling apparatus is provided with a number of limit switches. These limit switches, which will be hereinafter specifically identified, correlate the operation of conveyor units with the glass rolling apparatus.

Referring now to FIGS. 6 to 11, inclusive, there is illustrated a free standing conveyor unit, generally designated 135, particularly suited for use with the glass rolling apparatus forming a part of the present invention. In the position illustrated, the conveyor 135 is interposed between the discharge rollers of a warming oven and the glass rolling apparatus (not shown) and thus is adapted to function as a loading conveyor for the glass rolling apparatus. As will be later explained, the conveyor may also function as a receiving conveyor when positioned on the discharge side of the glass rolling apparatus.

The conveyor unit 135 is embodied in a supporting structure or stand comprising a weldment or open framework of channel sections and angle iron sections. The framework comprises elongated vertical frame members 136 at one end and short vertical frame members 137 at the other end. The vertical frame members are connected to a suitable base and are connected intermediate their ends by suitable horizontal side pieces 138 and end pieces 139. The upper ends of the vertical frame members 136 and 137 are connected by a weldment which forms a platform for a pair of spaced conveyor belt units, each being generally designated 141. The platform comprises pairs of angle irons 142 secured at one end to the vertical frame members 137. The spaced relationship of the angle irons 142 may best be seen in FIG. 9. The angle irons 142 are connected to a substantially rectangular frame structure comprising a horizontal laterally extending channel 143 which is paralleled by angle iron member 144, the end portions of the channel and angle iron member being joined by angle irons 145. It will be readily understood that the angle iron pieces such as the one designated 144 may not be a single piece but may be interrupted where it intersects cross members. The exact manner in which the platform or framework is welded together of channel and angle iron section is not believed important to an understanding of the invention.

It will be noted that the platform supporting the conveyor belt unit 141 is angularly inclined, for a reason to become apparent.

Each conveyor belt unit comprises a suitable belt 146 made of fabric or rubber composition material. Each belt passes over a pair of flat pulleys 147. One pulley, the higher one, as illustrated, is keyed to a shaft 148 journalled in pillow blocks 149 secured to the upper surface of each angle iron 145. The shaft 148 outboard of one pillow block 149 is provided with a sprocket 151 coupled by a drive chain 152 to a second sprocket 153.

The sprocket 153 is carried on the output shaft of a reduction gear unit 154 which, along with an electric drive motor 155, is supported on a suitable platform 156 on the conveyor base. In the present embodiment the reduction gear unit and drive motor are coupled by a chain and sprocket drive means, generally designated 157.

The pulleys 147 supporting the belts 146 at their lower ends are each journalled on shafts 158 each carried on a yoke or U-shaped bracket 159. The U-shaped brackets are slidably supported on the upper surface of the angle irons 142 for take-up adjustment of the belts 146. The adjusting device comprises a large bolt 161 secured at one end to a flange 162 on the bracket 159. The bolt freely passes through a fixed bar 163 secured to the upper surface of the angle irons 142. Suitable jam nuts 164 are provided to lock the adjusting bolt in adjusted position, in a conventional manner.

Cradled in the open space between the conveyor belt units 141 is a swinging frame, generally designated 165. The frame 165 is a weldment comprising angle iron sections 166 and 167 supporting a large rectangular plate 168. The plate extends for substantially half the length of the angle iron sections as best seen in FIGS. 6 and 8. The angle iron sections 166 and 167 are each provided with a step 169 intermediate the end of the plate 168 and their end sections 171.

In the illustrated embodiment of the conveyor unit, the frame 165 swings about a pivot axis formed of a shaft 172 suitably journalled beneath the rollers 173 of the discharge conveyor of the oven or other structure from which the conveyor receives the glass assembly. The frame 165 is supported intermediate its ends on air cylinder unit 174 which may be operated to swing the frame from its FIG. 6 position to its FIG. 7 position.

It will be noted that the plate 168 is provided with a series of upstanding tubes 175 which are welded or otherwise securely fastened in place. As shown in FIG. 11, each tube 175 is plugged at one end by a plug 176 which is drilled to receive the stem 177 of a caster device 178, a suitable set screw 179 being provided to hold the caster stem in place. The caster rollers are provided with a rubber tread 181.

When the swinging frame 165 is raised by the air cylinder 174, the casters 178 are raised above the level of the belt unit 141. In FIG. 10 the windshield 46 is illustrated as it appears when it is riding or being transported on the belts 146. Upon the swinging frame 165 being raised, the windshield is lifted free of the belts 146. The caster devices 178, or the rollers 182 thereof, are freely rotatable and, therefore, do not drive or resist movement of the windshield therealong. The significance of this will be explained.

It will be noted that the upper segment of each belt 146 slides along a boxlike member 183 supported on each pair of angle irons 142, the lower segment of the belt passing through the inside of the boxlike member. The windshield 46 is thus firmly supported against being laterally tipped by any cause during transport by the belts. The side wall of one of the boxlike members is used to support a pair of longitudinally spaced limit switches whose purpose will be explained.

With reference to FIGS. 13 to 17, inclusive, there is schematically represented the progression of the glass sandwich through a section of the production line. The particular phase of the operation illustrated is that relating to the tacking or prepressing of the sandwich. The apparatus represented comprises a feed conveyor, a glass rolling apparatus and a discharge conveyor.

Commencing with FIG. 13, the glass sandwich 46 is shown being transported by the feed conveyor unit 135 from the warming oven rolls 173 toward the glass rolling apparatus. At this point the glass sandwich 46 is resting wholly on the belts 146.

It was mentioned earlier that the conveyor unit and the rolling apparatus were provided with certain limit switches, to be identified. As seen in FIG. 6, the conveyor unit 135, particularly when set up as a feed conveyor unit, as in FIG. 13, is provided with a pair of longitudinally spaced limit switches 184 and 185 mounted on the side wall of one of the boxlike frame members supporting the upper segment of the belts 146. As the glass sandwich progresses down the conveyor unit, limit switch 185 is tripped. If the glass rolling apparatus or the tacker, as it will hereinafter be designated, is not in position to receive the glass sandwich, the conveyor will be stopped when the limit switch 185 is tripped.

The signal that the tacking apparatus is in position to receive the glass sandwich is indicated by actuation of the limit switch 188. The actuator 189 of the limit switch 188 lies in the path of swinging movement of the depending arm 118 mounted on the side member 24 of the inner frame assembly (see FIG. 2). That is, the tacking apparatus operator standing at the handwheel end of the apparatus must rotate the handwheel 115 to swing the frame assembly 23 to place the rollers in proper position to receive the glass sandwich, as schematically shown in FIG. 13.

With limit switches 185 and 188 tripped, the movement of the glass toward the tacker by the belts 146 continues until the pressure exerted by the glass sandwich on the actuator 186 of the limit switch 184 is relieved. As soon as this occurs, the control circuitry (as exemplified in FIG. 18) is such that the solenoid operated valve 191 (see FIG. 12) controlling the air cylinder 174 is actuated and air is admitted into the cylinder 174 causing the swingable frame 165 to be raised. By this action the glass sandwich is raised from the belts 146 and is supported on the freely rotatable casters 178. The belts 146 are thus rendered ineffective to cause further movement of the glass sandwich along the conveyor unit. The upward movement of the glass sandwich also results in the leading edge of the sandwich entering between the opposed pairs of nip rolls 42 and 56 whereupon the drive unit 90 roller sections 92 and 93 frictionally engage the glass sandwich and begin pulling the sandwich through the frame assembly 23. This phase of the progression of the glass sandwich is illustrated in FIG. 14.

FIG. 15 represents the conditions as they appear after the leading edge or wing tip of the glass sandwich has progressed somewhat through the rollers. It will be noted that a line through the centers of the rollers is substantially normal to the tangential plane of the glass. However, as the curved corner of the glass sandwich is reached, the tacker operator is required to swing the inner frame assembly 23 in a clockwise direction to maintain this normal condition.

FIG. 16 illustrates the conditions prevailing as the relative movement around the corner of the glass sandwich is completed. Since the trailing end of the windshield is supported on the freely rotatable casters 178, it is free to "fishtail" or to laterally rock back and forth as the leading end progresses through the rollers at the several angles to the horizontal assumed, such as caused by swinging movement of the frame 23 about its angularly inclined pivot axis.

As the inner frame assembly is swung to a dead center or substantially vertical position, as shown in FIG. 2, the actuator 192 of limit switch 193 is tripped causing two actions to be initiated. Solenoid 194 (see FIG. 12) is energized causing the air cylinder 174 of the discharge conveyor 195 to be actuated to raise the swingable frame 165 of this conveyor. The raising of the frame 165 raises the freely rotatable casters 178 into position to receive the glass sandwich 46. At the same time, solenoid 194 is de-energized causing the retraction of the air cylinder 174 of the feed conveyor 135 and the consequent lowering of the casters 178 thereon. During this phase of the progression of the glass through the tacker, it is supported between the opposed pairs of rollers 42 and 56 and the outboard rollers 132.

As the center portion of the glass sandwich progresses through the tacker, the operator maintains the tacker inner frame 23 in a substantially vertical position until the trailing corner is reached. The tacker inner frame 23 is then swung or permitted to swing to complete the movement in the clockwise direction. The leading edge of the glass sandwich 46 is deposited on the casters 178. Finally, the condition illustrated in FIG. 17 is obtained wherein the trailing edge of the glass sandwich is ready to pass from between the nip rollers.

As best seen in FIG. 1, a limit switch 196 is suspended from the underside of the channel section 32 forming part of the upper roller support structure 27. The actuator 197 of the limit switch 196 underlies one end of a lever arm 198 fulcrummed intermediate its ends beneath the channel section 32. The other end of the lever arm 198 is coupled to an upright finger 199 supported on the support shaft 64 of one of the centrally positioned upper rollers 42 located immediately above the drive unit 90 roller section 92. Since the latter is rigidly mounted, the insertion of the glass sandwich between its surface and that of the opposing roller 42 will result in an upward movement of the shaft 64 and the finger 199 coupled thereon. Upon the glass sandwich leaving the rollers, the downward movement of the finger 199 is transmitted to the lever arm 198 and the pressure on the actuator 197 of the limit switch 196 is relieved. The opening of this switch causes de-energization of solenoid 194 and the consequent lowering of the caster supporting frame of the discharge conveyor 195. In this manner, the glass sandwich is transferred to the belts 146 of the discharge conveyor 195 for transport to a further conveyor 201 or the like.

It is believed readily apparent from the foregoing that the feed conveyor 135 and discharge conveyor 195 are mechanically the same structure. The difference is that the feed conveyor is provided with the limit switches 184 and 185 which are not used on the discharge conveyor. Both conveyors are in part controlled by limit switches on the tacker but the control circuits involved do not effect the mechanical structure of the conveyors. The direction of movement of the belts 146 is reversed, the feed conveyor belts carrying the glass downwardly toward the tacker while the discharge conveyor belts carry it upwardly away from the tacker. However, reversible drive units are readily obtainable and their applicability to the conveyor embodied herein is believed readily apparent.

It will be understood that the invention is not to be limited to the exact construction shown and described, but that various changes and modifications may be made without departing from the spirit and scope of the invention, as defined in the appended claims.

What is claimed is:

1. Conveyor apparatus for conveying glass sheets to or from a glass rolling machine, said apparatus comprising: a base structure, at least a pair of parallel, endless conveyor belts supported from the base structure and having portions lying generally in a common plane and adapted to support glass sheets, means operable to drive said belts, a series of rollers capable of rotation in any plane perpendicular to the general plane of the conveyor belts, a retractable frame carried on the base for supporting said rollers between the belts, and means operable to position said rollers selectively above or below the level of the glass sheet supporting portion of said belts, whereby the glass sheets are movably supported from the base structure either on the belts or on the rollers.

2. Conveyor apparatus for transporting glass sheets to or from a glass rolling machine, said apparatus comprising: a base structure, an endless conveyor belt supported on said base structure, and having a portion defining a glass supporting plane and adapted to support glass sheets, means operable to drive said belt, a series of freely rotatable rollers mounted for castering movement on axes generally perpendicular to the plane of said belt, a movably mounted member supporting said rollers for selective positioning above or below the level of the glass sheet supporting portion of said conveyor belt, power means for moving the movably mounted member between its two positions, and control means for controlling the actuation of the power means, said rollers, when above the conveyor belt, supporting the glass sheets independently of said belt.

3. Conveyor apparatus for transporting glass sheets to and from a glass rolling machine, said apparatus comprising: a base structure, a first support means supporting said glass sheets for movement relative to said base structure comprising an endless belt conveyor carried by the base structure, the conveyor being constructed and arranged to carry the glass sheets along a predetermined direction of movement, power-operated means for driving the conveyor, a second support means comprising freely rotatable rollers mounted for castering movement, power-operated means supporting said rollers for selective positioning of the upper portion of the rollers either above or below the glass sheet supporting level of the belt conveyor, and control means for controlling the actuation of said last mentioned power-operated means responsive to a glass sheet reaching a predetermined position along the conveyor unit to shift the support of said sheet from one to the other of said support means.

4. A conveyor unit for transporting glass sheets to or from glass rolling apparatus, said unit comprising: a base structure, at least one driven endless belt conveyor mounted on the base structure, freely rotatable rollers mounted for castering movement, the rollers being supported on a common frame and being selectively positionable above or below the conveyor, and control means on the conveyor unit and actuated responsive to movement of a glass sheet along said unit for raising or lowering the rollers to shift support of the glass sheet between the conveyor belt and the rollers upon the glass sheet reaching a predetermined position along the conveyor.

5. Glass laminating apparatus comprising a conveyor unit in juxtaposition to a glass rolling unit, said glass rolling unit comprising a tiltable frame and opposed rollers supported within said frame for applying pressure to glass sheets passed therebetween, said conveyor device comprising a base structure, driven belt devices mounted on said base structure, freely rotatable roller devices mounted for castering movement, means carried by said base structure for selectively positioning said roller devices above or below said belt devices, and interrelated control means on said units effective to control the position of said roller devices relative to said belt devices to shift the support from one to the other upon said glass sheets reaching a predetermined position relative to said rollers, said control means including limit switches responsive to the position of said glass sheets whereby said roller devices are positioned to support said glass sheets while passing through said opposed rollers and said belt devices are adapted to support and transport said glass sheets when clear of said rollers.

6. In an apparatus for applying pressure to curved glass sheets to be laminated, a substantially rectangular frame having spaced longitudinally extending structural members, means supporting said frame for tilting movement about an axis extending longitudinally of said frame between said structural members, a plurality of rollers arranged in two opposing rows adapted to receive a glass sheet therebetween, said rollers in one row each being independently supported by respective shaft means independently slidably journaled on structural members at one side of said frame tilting axis, selected ones of the rollers in the other row being supported on support arms fulcrumed on structural members at the other side of said frame tilting axis, and means biasing said shaft members and support arms to urge the rollers supported thereon toward each other.

7. In an apparatus for applying pressure to curved glass sheets to be laminated, a substantially rectangular frame having spaced longitudinally extending structural members, means supporting said frame for tilting movement about an axis extending longitudinally of said frame between said structural members, a plurality of rollers arranged in two opposing rows adapted to receive a glass sheet therebetween, said rollers in one row each being independently supported by respective shaft means independently slidably journaled on structural members at one side of said frame tilting axis, means carried by the structural members at the side of said frame tilting axis rotatably driving at least one of the rollers in said other row, each of the non-driven rollers in said other row being supported on support arms fulcrumed on the structural members at said other side of the frame tilting axis, and means independently biasing said shaft members and support arms to urge the rollers supported thereon toward each other.

8. In an apparatus for applying pressure to curved glass sheets to be laminated, a substantially rectangular frame having spaced longitudinally extending structural members, means supporting said frame for tilting movement about an axis extending longitudinally of said frame between said structural members, a plurality of rollers arranged in two opposing rows adapted to receive a glass sheet therebetween, means rotatably supporting the rollers in each row for independent rotation, said support means for the rollers in one row comprising elongated shaft members each having one roller rotatably journaled at one end thereof, means independently slidably journaling said shaft members on structural members at one side of said frame tilting axis, said support means for selected ones of the rollers in the other row comprising support arms each having one roller rotatably journaled at one end thereof, means independently pivotally supporting said support arms on the structural members at the other side of said frame tilting axis, and means independently biasing said shaft members and support arms to urge the rollers supported thereon toward each other.

9. In an apparatus for applying pressure to curved glass sheets to be laminated, a substantially rectangular frame having spaced longitudinally extending structural members, means supporting said frame for tilting movement about an axis extending longitudinally of said frame between said structural members, a plurality of rollers arranged in two opposing rows adapted to receive a glass sheet therebetween, means rotatably supporting the rollers in each row for independent rotation, said support means for the rollers in one row comprising elongated shaft members each having one roller rotatably journaled at one end thereof, means independently slidably journaling said shaft members on structural members at one side of said frame tilting axis, means carried by the structural members at the other side of said frame tilting axis rotatably driving at least one of the rollers in the other row, said support means for the non-driven rollers in said other row comprising support arms each having one roller rotatably journaled at one end thereof, means pivotally supporting said support arms on the structural members at said other side of said frame tilting axis, and means independently biasing said shaft members and support arms to urge the rollers supported thereof toward each other.

10. In an apparatus for applying pressure to curved glass sheets to be laminated, a substantially rectangular frame having spaced longitudinally extending structural members, means supporting said frame for tilting movement about an axis extending longitudinally of said frame between said structural members, a plurality of rollers arranged in two opposing rows adapted to receive a glass sheet therebetween, said rollers in one row each being independently supported by respective shaft means independently slidably journaled on structural members at one side of said frame tilting axis, the longitudinal axes of all of said shaft means lying in a common plane, the longitudinal axes of selected ones of said shaft means being inclined relative to the others, selected ones of the rollers in the other row being supported on support arms fulcrumed on structural members at the other side of said frame tilting axis, all of the axes of rotation of the rollers on the ends of the support arms lying in substantially a common plane, the axes of rotation of selected ones of said rollers being inclined relative to the others, and means biasing said shaft members and support arms to urge the rollers supported thereon toward each other.

11. In an apparatus for applying pressure to curved glass sheets to be laminated, a substantially rectangular frame having spaced longitudinally extending structural members, means supporting said frame for tilting movement about an axis extending longitudinally of said frame between said structural members, a plurality of rollers arranged in two opposing rows adapted to receive a glass sheet therebetween, said rollers in one row each being independently supported by respective shaft means independently slidably journaled on structural members at one side of said frame tilting axis, the longitudinal axes of all of said shaft means lying in a common plane, the longitudinal axes of selected ones of said shaft means being inclined relative to the others, means carried by the structural members at the side of said frame tilting axis rotatably driving at least one of the rollers in said other row, each of the non-driven rollers in said other row being supported on support arms fulcrumed on the structural members at said other side of the frame tilting axis, all of the axes of rotation of the rollers on the ends of the support arms lying in substantially a common plane, the axes of rotation of selected ones of said rollers being inclined relative to the other, and means independently biasing said shaft members and support arms to urge the rollers supported thereon toward each other.

12. Conveyor apparatus for conveying glass sheets to or from a glass rolling machine, said apparatus comprising: a base structure, a pair of endless belts having generally flat runs lying generally in a common plane and adapted to support glass sheets thereon, means supporting said endless belts in spaced parallel relation at each side of said base, means operable to drive said belts, roller devices located between the belts and mounted for castering movement on axes generally perpendicular to the plane of the belts, retractable means supporting said roller devices from the base structure, and means mounted on the base structure, connected with the retractable means and operable to selectively position said roller devices above or below the glass sheet support level of said belt, whereby said glass sheets are carried by said belts or are freely movable on said roller devices.

13. Conveyor apparatus for transporting glass sheets to or from a glass rolling machine, said apparatus comprising: a base structure, an endless belt conveyor supported on said base structure and having a portion lying generally in a plane and adapted to support glass sheets, means operable to drive said belt, a series of freely rotatable rollers mounted for castering movement on axes generally perpendicular to the plane of said belt, the series of rollers and the belt being relatively movable to selectively position the rollers either above or below the level of the glass sheet supporting portion of the belt, and power means mounted on the base structure for causing said relative movement.

References Cited in the file of this patent

UNITED STATES PATENTS

| | | |
|---|---|---|
| 492,613 | Pierce | Feb. 28, 1893 |
| 2,340,933 | Chilton | Feb. 8, 1944 |
| 2,525,980 | Walters | Oct. 17, 1950 |
| 2,618,012 | Milne | Nov. 18, 1952 |
| 2,628,177 | Boicey et al. | Feb. 10, 1953 |
| 2,644,496 | Shubert | July 7, 1953 |
| 2,677,918 | Bird et al. | May 11, 1954 |
| 2,825,671 | Langhart et al. | Mar. 4, 1958 |
| 2,829,587 | Russell | Apr. 8, 1958 |
| 2,831,791 | Downes et al. | Apr. 22, 1958 |

FOREIGN PATENTS

| | | |
|---|---|---|
| 217,493 | Australia | Oct. 8, 1958 |